July 16, 1929.  A. C. HARDY ET AL  1,721,216
ELECTRICAL CONTROLLING APPARATUS
Filed June 25, 1926
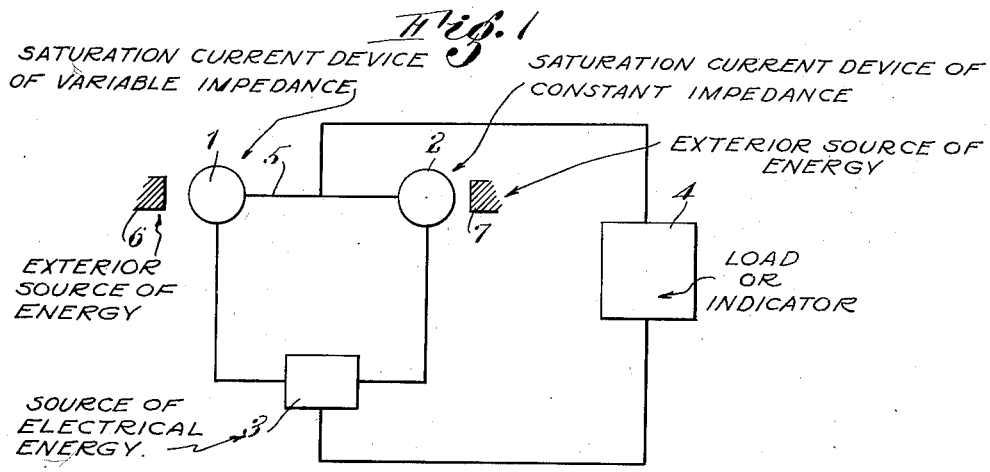
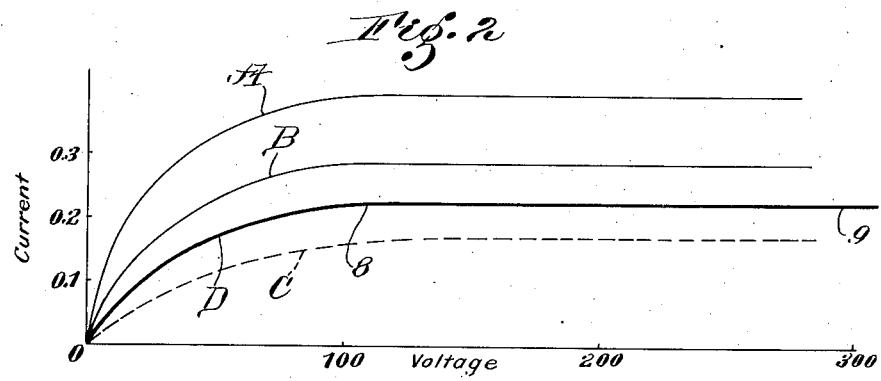
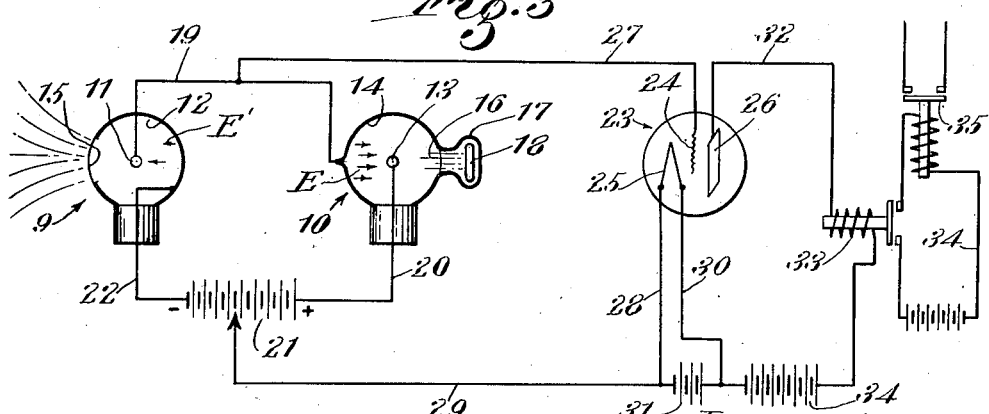
Inventors:
Arthur C. Hardy
Frederick W. Cunningham
by Roberts Cushman Woodberry
Attorneys Patented July 16, 1929.

1,721,216

UNITED STATES PATENT OFFICE.

ARTHUR C. HARDY, OF WELLESLEY, MASSACHUSETTS, AND FREDERICK W. CUNNINGHAM, OF STAMFORD, CONNECTICUT.

ELECTRICAL CONTROLLING APPARATUS.

Application filed June 25, 1926. Serial No. 118,607.

This invention pertains to electrical apparatus and more particularly to a controlling device responsive to minute variations in energy intensity accompanying certain natural phenomena and by its response to such minute variations in intensity determining the occurrence of other phenomena.

In the practice of various arts certain natural phenomena are encountered pertaining, for example, to light, heat, electricity, etc. which are characterized by progressive variation in energy intensity. It is frequently desirable to cause some action or operation (electrical, mechanical, chemical, etc.) to take place at a definite and predeterminate point or condition in such range of intensity variation, but as the intensity range may be very great, difficulty has been experienced in devising a sensitive controller which will operate accurately and abruptly at a desired point or condition in such range of variation and at no other point or condition.

This difficulty is accentuated in cases where the available energy involved in the particular phenomena under consideration is small so that the controlling device must be extremely sensitive and responsive to a minute change differentiating the selected point in the variation range from points immediately above or below it.

Accuracy in control under such circumstances appears to be obtainable only by balancing the energy available at any time in such varying intensity range against other energy, which may also vary progressively but which is preferably invariable, and has the intensity value at which the control is intended to function. Electrical methods of balancing energy afford the necessary delicacy, but such methods, in most instances, involve the employment of a standard of electrical energy which must be substantially unvarying for long periods of time.

We have now discovered that certain instrumentalities known to the electrical arts and which we have for convenience termed "saturation current devices" when properly associated, provide the desired standards of energy for comparison and provide an accuracy of automatic control heretofore unattainable so far as known to us.

In our reference herein to "saturation current devices" we intend broadly to include devices which have the property of limiting the current flow to a substantially unvarying amount irrespective of the applied potential, at least within a long and predeterminate range of potential, or generally speaking, those devices in which the rate of increase of current with voltage is less than the ratio of the current to the voltage. Among such devices may be mentioned photo-electric cells, thermionic tubes, ionization chambers, etc. The operation of such devices may be graphically likened to that of a pin hole orifice in a diaphragm supporting a body of granular material, for example, sand, and which limits flow of such material to a definite maximum regardless of increase in pressure beyond a certain point.

In devices such, for example, as thermionic tubes and photo-electric cells this saturation current effect is obtained when the voltage applied is so high that all of the electrons emitted from the cathode are drawn away to the anode. For all values, within definite limits, of this applied voltage, greater than the minimum value necessary to secure the saturation effect, the current is substantially independent of the voltage and varies only in accordance with some one other factor. For example, in the photo-electric cell the current varies in substantially direct accordance with the light intensity, while in the thermionic tube variation in temperature is the controlling factor.

Thus by employing such a saturation current device and maintaining a voltage, variable within wide limits either in one direction or cyclically, whose effective or average value always exceeds the critical value, the device may be made to respond accurately and in substantially exact accordance with one other variable factor, as, for example, light intensity, and if in such case a standard source of light or other suitable form of energy be employed, such saturation current device may be made to function as an unvarying standard of comparison.

By combining two such devices in proper relation as will hereinafter be set forth, one of such devices being subjected to the varying range of intensity prevailing in the particular phenomena under consideration and the other of which is standardized to a particular value, we are able to produce a control having most exquisite delicacy of response; which at the same time may be subjected to an intensity range of substantially any length; and which responds abruptly rather than gradually to those most minute differences in energy which differentiate the point of control from intensities at either side of such point.

In the present discussion we have employed the term "energy" in a broadly comprehensive sense to include not only the various forms of kinetic energy, but also those forms which may broadly be denoted "potential" energy including mere states of stress such as those occurring in a magnetic field.

For convenience in the present discussion we employ the nomenclature of present day physicists and in particular have frequently referred to electrons and current flow, but recognize that much of the modern theory of electricity and of the constitution of matter in general is at least questionable, and desire this description to be interpreted in the light of the day in which it is written.

As one specific application of our invention we shall hereafter describe it as embodied in apparatus for automatically controlling the current in an electric lighting circuit in such a way that as daylight fades below a certain definite and fixed intensity the lamps in the circuit will be lighted, while at sunrise the opposite action will take place and the lamps will be extinguished. Such an arrangement is extremely useful in many places where local lighting circuits are remote from the central power station so that it is ordinarily necessary to install a control circuit between the station and the local circuit switch.

The automatic control of a lighting circuit in accordance with variations in daylight intensity has not, so far as is known to us, been practically accomplished prior to our invention, since the range of light intensity between night and full sunlight is enormous, although the difference in intensity between the beginning of twilight and the point at which the lamps are to be lighted may be relatively very small. In view of this fact it has heretofore appeared necessary in designing control devices of this character to sacrifice delicacy of response in order to avoid injury in the apparatus at the maximum intensity with the result that the lamps were lighted either long before or long after the desired time, which of course precludes the use of such apparatus as a practical matter, or else it has been deemed necessary to include protective devices of complex character, making the installation expensive and its upkeep difficult.

The application of our new principle to such lighting circuit control avoids the above difficulties and permits automatic control under the most adverse conditions of light variation and with the utmost accuracy as to the selected light intensity at which the lamps shall be lighted or extinguished.

In the following description and accompanying drawings we indicate in a broad and general way the underlying principle involved in the application of our invention and have, as just stated, disclosed one specific application of the invention in its adaptation to the control of an electric circuit in accordance with variation in light intensity. However, it is to be understood that such specific example is merely by way of illustration and is in no sense restrictive of the application of the principle involved.

In the accompanying drawings,

Fig. 1 is a diagram illustrating the principle involved in the application of our invention;

Fig. 2 is a diagram graphically illustrating the relation of current to voltage in one type of saturation current device; and Fig. 3 is a diagram illustrating a desirable arrangement of circuits for controlling an electrical lighting system by variation in solar light intensity.

Referring to Fig. 1 the numerals 1 and 2 indicate respectively saturation current devices such, for example, as photo-electric cells, thermionic tubes, ionization chambers, etc. or in fact any device having the characteristic relationship between voltage and current which has herein been referred to as a saturation current effect. The devices 1 and 2 may be of the same or different type as desired. The numeral 3 indicates a suitable source of electro-motive force, either alternating or direct (necessarily direct unless one or the other of the devices 1 and 2 is a unilateral conductor of electricity). The saturation current devices 1 and 2 are connected in series with the source of electromotive force 3 and the latter furnishes energy at a sufficiently high potential, direct or alternating, to produce a saturation current in the devices 1 and 2. This potential may vary to substantially any desired extent provided it be high enough to establish a saturation current. The numeral 4 designates a device of any suitable type, for example, a thermionic tube, a quadrant electrometer, or other device which is sensitively responsive to variations in potential and which draws but little current from the conductor 5 to which it is connected. This conductor 5 connects the devices 1 and 2 and forms a portion of the circuit through the source of electro-motive force 3.

The saturation current device 1 has associated therewith a source of energy 6 while the device 2 has associated therewith a source of energy 7. These sources of energy 6 and 7 are independent of the source 3 of electromotive force and may furnish energy of any type, for example, electromagnetic, heat or chemical, and both of the sources may vary in intensity, although it is preferred to make one of said sources, for example, the source 7, substantially constant.

In Fig. 2 we have shown diagrammatically the general relation between the voltage and current in one type of saturation current device, and the curves A, B, C and D are in general substantially characteristic of such relationship under various circumstances.

Referring to Fig. 2, and particularly to the curve D, it may be noted that from the point 8 to the point 9 this curve is substantially horizontal, indicating substantially constant current throughout a voltage variation of 200 volts. Thus, in a saturation current device having this characteristic curve, increase in voltage beyond 100 volts has substantially no effect upon the current which remains nearly constant for increasing voltages throughout a long range.

Devices having this characteristic commonly have the further qualification that when subjected to energy from some other source, the current will vary with the intensity of such energy. Thus, for example, the photo-electric cell, when employed as a saturation current device, produces a variation in current in accordance with the variation in light intensity. On the other hand, a thermionic tube varies the current in accordance with the heat supply, etc. In Fig. 2 the curves A, B and C may be considered to indicate the change in current in accordance with variations in such source of external energy.

Reverting to Fig. 1, and assuming for the moment that the energy source 7 is constant and less in value than the energy source 6, and that a saturation current is flowing through the device 2, the current flow will be determined solely by the action of the device 2 which is subject to the lesser intensity of external energy, since this device will permit only such current to pass as corresponds to the energy emitted by the source 7. No matter how great (within reasonable and finite limits) the intensity of energy emitted from the source 6, substantially no additional current is permitted to pass through the system than that permitted by the device 2.

If it now be assumed that the source 6 of energy gradually decreases in intensity, a point will eventually be reached at which the combined current (i. e. the photo-electric and the dynamic currents) through the device 1 will equal the current flowing in the device 2. At the instant the drop in energy from the source 6 causes the current in the device 1 to fall even to the slightest degree below that flowing through the device 2, the device 1 assumes sole control of the current and for the time being the device 2 may be considered to be eliminated.

While the device 2 is in control, the current flowing through this device determines a certain potential in the conductor 5 and thus at the detector device 4 this potential remains substantially constant so long as the device 2 remains in control, but immediately upon the shift of control to the device 1 the current in the system varies below normal (as ordinarily determined by the device 2), the potential in the conductor 5 varies from normal and the detector 4 responds to such change in potential. The response of this detector 4 may in any known manner be employed for controlling any desired part or operation.

While in the above discussion the source 7 has been indicated as a constant energy source, it may be noted that both the sources 6 and 7 may vary and that whenever in their variation the algebraic difference in the saturation currents passes from plus to minus the current in the circuit will vary and the detector 4 will be caused to act.

Referring again to the case in which the source 7 is constant, the graphic curve D in Fig. 2 may be considered to indicate the current condition as determined by the device 2. The curves A and B may also be assumed to indicate the current conditons which would occur at different intensities of the source 6 (provided the device 1 were acting alone). Thus as the intensity of the source 6 varies the series of graphic curves A, B, etc. gradually approaches coincidence with the curve D which is that determined by the device 2. Since all of the curves of this series have extended portions which are substantially horizontal and which represent the effective saturation currents, it will be noted that the curves A, B, etc. will remain in coincidence with the curve D (upon progressive change in intensity in the source 6) for an extremely short period of time, the continued change in energy from the source 6 resulting in the almost instantaneous movement of the curve representing the device 1 from a point above the curve D to a position below such curve. The transfer of control is thus substantially instantaneous so that such an arrangement is exceedingly delicate in its action and responds with the greatest promptness when the desired point in the range of intensity variation is reached.

In order more clearly to describe the underlying principle of our invention, we show in Fig. 3 a specific application thereof to the control of an electric-lighting circuit in an automatic manner in response to variations in solar light. (By solar light we intend broadly to include light, whether direct or indirect, received from the sun, or broadly speaking, daylight.)

In Fig. 3 the numerals 9 and 10 indicate a pair of photo-electric cells of well-known type. The cell 9 contains an anode 11 and a cathode 12, the latter preferably consisting of a reflecting layer upon the inner surface of the cell. Likewise, the cell 10 has the anode 13 and the cathode 14.

The cell 9 is provided with a window 15 through which light may be admitted, and this cell is preferably exposed to solar illumination when employed for the purpose above described, it being understood that any suitable source of illumination may be employed in accordance with the purpose for which the apparatus is intended.

Likewise, the cell 10 is furnished with a window 16, and is preferably provided with a housing 17 to exclude external light from the window and within this housing is arranged a light source 18 of substantially constant intensity. Such a light source may consist of a tube containing phosphorescent or radioactive material, or the housing may be provided with a lamp of a type which gives a substantially constant light. In any event the light source 18 should ordinarily be relatively faint as compared with the light which is admitted through the window 15 of the cell 9 since the source 18 of light determines that minimum value of illumination at which the apparatus operates to actuate the controlled arrangement.

The anode 11 is connected to the cathode 14 by means of a conductor 19. The anode 13 is connected by means of a conductor 20 to the positive pole of a battery 21 while the cathode 12 is connected by the conductor 22 to the negative pole of this battery. The cells are thus in series with the battery 21.

The numeral 23 designates a thermionic tube having the grid 24, the filament 25 and the plate 26. The grid 24 is connected by the conductor 27 to the conductor 19. One terminal of the filament 25 is connected by conductors 28 and 29 to the battery 21. The other terminal of the filament 25 is connected by the conductor 30 to the positive pole of the battery 31 which furnishes the filament heating current. The plate 26 is provided with a conductor 32 leading to a relay device 33 which in turn is connected to the positive pole of a battery 34 energizing the plate circuit. The relay 33 is adapted to close a circuit 34 which may be the ultimate controlled circuit if desired but which preferably actuates a switch 35 for controlling the lighting circuit.

In the operation of the device, the tube 9 being freely exposed to daylight and the source 18 furnishing illumination corresponding to that intensity of light at which the controlling switch is to be actuated, either to turn on or shut off the current, the cell 10 normally controls the operation during the daytime. In this cell the cathode is relatively poorly illuminated so that the electron stream E flowing from the cathode 14 to the anode 13 is relatively small, with the result that the saturation current through the circuit including the cells is slight. While the cathode 12 of the cell 9 is exposed to intense light, which may exceed the illumination from the source 18 as much as ten thousand times or more and while, if the cell 9 alone were employed, the electron stream E' would be very great as compared with that of the cell 10, no current of corresponding value is permitted to flow since the cell 10 chokes this stream and reduces the current to the minimum permitted by the cell 10 itself. Thus at all levels of illumination of the cell 9, above that of the cell 10, the potential in the conductor 19 and thus in the grid 24 will be substantially equal to that of the negative end of the battery 21. As the solar illumination decreases at sunset the level of illumination of the cell 9 will gradually drop until at the instant that it equals the illumination in the cell 10 the cell 9 will become the control element. Beyond this point the current is no longer controlled in accordance with illumination from the source 18, but by the lesser illumination entering the window 15. The electron stream E' from cathode 12 to anode 11 thus becomes less than the normal stream E flowing from the cathode 14, with a corresponding current drop and fall in potential in the conductor 19. The grid 24 now becomes relatively positive, as compared with its previous condition, permitting flow of electrons from the filament 25 to the plate 26. Current now flows through the plate circuit, energizing the relay 33 and actuating the switch 35 to turn on the lighting circuit. When in the morning the reverse operation takes place and the cell 10 again becomes the controlling element, the relay 33 is again actuated to open the switch 35.

It will be noted that with this mode of connection, although the intensity of the light admitted through the window 15 may be enormous as compared with the light from the source 18 and may vary through a very great range, the maximum current which may flow through the cells 9 and 10 at any time is that determined by the cell 10, so that no matter how great the illumination at the window 15, no injurious current may pass through the system. Furthermore, as above pointed out, the point of control is very definite and there is no gradual shift from one condition to the other in the system such as would be produced were resistances of ordinary type employed in place of the saturation current devices 9 and 10.

While the arrangement indicated in Fig. 3 is preferred, that is to say that in which the minimum current cell 10 has its cathode connected to the anode of the other cell, the reverse arrangement might be employed but in such event the current flowing through the system at any time would be that determined by the cell having the maximum illumination and under most circumstances this would not be desirable.

From the foregoing, it will be evident that we have provided an electrical network or bridge comprising saturation current devices 9–10 (Fig. 3) and source of current 21 in closed circuit relation, energy for load 23 being derived from the equipotential conductor joining said devices and a tap on the battery or other source of current. The circuital arrangement is characterized by an abrupt electrical effect when device 9 under reduced illumination, takes over a substantial part of the current control.

While photo-electric cells have been described more particularly in illustrating the application of our invention, it is clear that other saturation current devices, such for example as thermionic tubes might be substituted for the cells 9 and 10 and that corresponding different types of energy might be employed for varying the current in such devices. As already pointed out, the apparatus is of broad application and if desired the control devices, represented in Fig. 3 by the like photo-electric cells, may be of different character. For example, the cell 10 might be replaced by a thermionic tube and subjected to heat variation, thus forming a combined control dependent upon mutual relations of heat and light. Again, in the arrangement shown in Fig. 3 it is possible, and perhaps quite desirable, to replace the cell 10 by an ionization chamber, since such a device would provide substantially constant energy for determining the maximum saturation current and at the same time could be made very small and compact. Accordingly, we wish it to be understood that our invention is not necessarily limited to the specific arrangement shown in Fig. 3 of the drawings but that it includes broadly the employment of a plurality of saturation current devices in such a manner as to obtain the results above generally referred to.

We claim:

1. A controlling apparatus of the class described comprising a pair of devices operating at current saturation, means connecting said devices in series with a source of electro-motive force, one at least of said devices being exposed to energy independent of said electro-motive force, such energy progressively varying in intensity, one of said devices determining the flow of current in the system so long as said varying energy exceeds a predetermined intensity and the other device taking sole control and determining the current flow when said varying energy falls below said predetermined intensity.

2. A controlling apparatus comprising a plurality of saturation current devices, means connecting them with a source of electromotive force, said source maintaining a saturation current effect in said devices, one at least of said devices being exposed to energy of varying intensity independent of said electromotive source, said devices being so related that a part at least of the connecting means is maintained at a substantially constant electrical potential so long as said energy intensity remains above or below a predetermined point in the range of intensity variation, but whose potential varies abruptly at said predetermined point, and a device which responds to said abrupt variation in potential of said part.

3. A controlling apparatus of the class described comprising a pair of saturation current devices, means connecting said devices in series with a source of electro-motive force, one at least of said devices comprising an anode and a cathode, saide cathode being exposed to energy of varying intensity independent of said source of electro-motive force, said cathode emitting electrons in accordance with such variation in energy, and means responsive to variation in potential in the connections between said saturation current devices for translating the potential variations into mechanical effects.

4. A controlling apparatus of the class described comprising a pair of saturation current devices each having an anode and a cathode, means connecting the anode of one device to the cathode of the other, a source of electro-motive force in series with said device, the cathode of each device being exposed to energy independent of said source of electro-motive force, the energy delivered to each cathode determining the rate of electron emission therefrom, and means responsive to variation in potential in said means connecting the anode of one device to the cathode of the other device for translating the potential variations into mechanical effects.

5. A controlling apparatus of the class described comprising a pair of saturation current devices one of which is a photo-electric cell, conducting means connecting said devices with a source of electro-motive force, each of said devices being exposed to energy independent of said source, the energy thus received by at least one device being variable, a thermionic tube having its grid connected to the conducting means uniting said devices, and a controlled element in the plate circuit of said tube.

6. A controlling apparatus of the class described comprising a pair of saturation current devices each comprising an anode and a cathode, a conductor uniting the anode of one device to the cathode of the other, means providing electro-motive force sufficient to maintain a saturation current effect in at least one of said devices, a thermionic tube having its grid connected to said conductor, and a controlled element in the plate circuit of said tube, the cathodes of the respective devices being exposed to energy independent of said source of electro-motive force, the energy thus supplied to at least one cathode being variable.

7. A controlling appartus of the class described comprising a pair of saturation current devices one of which is a photo-electric cell each comprising an anode and a cathode, a conductor uniting the anode of one device to the cathode of the other, means providing electro-motive force sufficient to maintain a saturation current in at least one device, means independent of said source delivering energy at a substantially constant rate to one cathode, the other cathode receiving energy at a varying rate, and a detector connected to said conductor and responding to variation in potential therein.

8. A controlling apparatus of the class described comprising a pair of saturation current devices each comprising an anode and a cathode, a conductor uniting the anode of one device to the cathode of the other, means providing electro-motive force sufficient to maintain a saturation current in each of said devices, means, independent of said source, for delivering energy at a substantially constant rate to one cathode, the other cathode receiving energy at a varying rate, a thermionic tube having its grid connected to said conductor, and a controlled element in the plate circuit of said tube.

9. A controlling apparatus comprising a pair of photo-electric cells connected in series with a source of electro-motive force of sufficient magnitude to cause saturation current effects in the cells, the cathodes of said cells being exposed respectively to independent sources of illumination, and a detector connected to the conducting means uniting said cells, said detector responding to variation in potential in said conducting means.

10. A controlling apparatus comprising a pair of photo-electric cells, each cell having an anode and a cathode, a conductor connecting the anode of one cell to the cathode of the other cell, means providing electro-motive force sufficient to maintain a saturation current in at least one cell, a source of substantially constant light intensity illuminating the cathode of one cell, the cathode of the other cell being exposed to varying light intensities, and a detector connected to said conductor, said detector responding to variations in potential in said conductor.

11. A controlling apparatus comprising a pair of photo-electric cells, each cell having an anode and a cathode, a conductor connecting the anode of one cell to the cathode of the other cell, means providing electro-motive force sufficient to maintain a saturation current in at least one cell, a source of substantially constant light intensity illuminating the cathode of one cell, the cathode of the other cell being exposed to varying light intensities, a thermionic tube having its grid connected to said conductor, means supplying energy to heat the filament of said tube, and a controlled element actuable by the current flowing in the plate circuit of said tube.

12. A controlling apparatus comprising a pair of photo-electric cells connected in series with a source of electro-motive force, a source of substantially constant light intensity for illuminating one cell, the other cell being exposed to solar illumination, a detector responsive to variation in potential in the conductor connecting the cells, a relay controlled by said detector, and a lighting circuit switch controlled by said relay.

13. A controlling apparatus comprising a photo-electric cell and an ionization chamber, means connecting said cell and chamber in series with a source of electro-motive force, means furnishing a substantially unvarying source of energy to the ionization chamber, the cell being subject to variable light intensity, a thermionic tube having its grid connected to the conducting means uniting the cell and chamber, and a relay device connected into the plate circuit of the tube.

14. A controlling apparatus comprising a pair of photo-electric cells each having an anode and a cathode, a conductor uniting the anode of the first cell to the cathode of the second cell, phosphorescent material furnishing a source of substantially unvarying but faint light intensity illuminating the second cell, the cathode of the first cell being exposed to illumination of a wide range of intensity, means providing electro-motive force sufficient to maintain a saturation current in at least one of the cells, a thermionic tube having its grid connected to said conductor, means supplying energy to the plate circuit of said tube, and a relay device connected into said plate circuit and adapted to control the flow of current in the circuit to be controlled.

15. In electrical apparatus, a closed circuit network comprising space current paths arranged in series and having resistances which respond to vibrations of an order of frequency comparable to light, a source of electrical energy for maintaining current saturation effects within each path, and means, including a source emanating waves of light frequency and external to the network, for changing the saturation level of one of the paths.

16. In electrical apparatus, a closed circuit network comprising space current paths in series, each of the paths containing material which liberates free electrons at a rate varying with the intensity of light to which said material is exposed and which is subjected to an electromotive force sufficiently high to maintain within the network, a condition such that the rate of increase of current with voltage is less than the ratio of the current to the voltage, one of said paths being acted upon by a light source of constant intensity and another by a light source of variable intensity, and means forming part of the network, for indicating when the light intensities are equal.

17. In electrical apparatus a bridge arrangement having arms of the following members in sequence, a source of electromotive force, another source of electromotive force, a photo-electric cell and another photo-electric cell, each cell having a cathode and an anode, the two sources of electromotive force being poled in series and of combined magnitude such that substantially all of the electrons emitted by the cathodes of the respective cells are drawn away to the corresponding anodes, and an external circuit connected between the conductors joining the photo-electric cells and joining the sources of electromotive force.

18. In electrical apparatus, a closed circuit network comprising a plurality of photo-electric cells each having a cathode and an anode, means connecting said cells in cascade with a source of current of potential sufficiently high to cause substantially all of the electrons emitted by the cathodes of the cells to be drawn away to the respective anodes, one of said cells being subjected to a light source of constant intensity and another to a variable light source of an intensity which continually approaches that of the constant source and means responsive to energy derived from the network when the intensity of the variable light source is less than that of the constant source, for energizing an external circuit.

19. A controlling apparatus of the class described comprising a pair of saturation current devices, means connecting said devices in series with a source of electromotive force, one at least of said devices comprising an element which is exposed to energy of varying intensity independent of said source of electromotive force, said element liberating free electrons at a rate varying in response to variation in the energy to which it is exposed, and means responsive to variation in potential in the connections between said saturation current devices for translating the potential variations into mechanical effects.

Signed by us at Boston, Massachusetts, this 12th day of June, 1926.

ARTHUR C. HARDY.
FREDERICK W. CUNNINGHAM.